A method of transmitting a discovery signal by a first UE for device-to-device (D2D) communication in a wireless communication system according to the present invention includes a step of a first UE transmitting a discovery signal for identifying a second UE for D2D communication, wherein the discovery signal includes information related to the presence or absence of D2D data for the D2D communication.

11 Claims, 10 Drawing Sheets

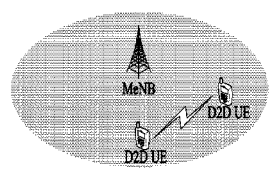

(a) D2D Discovery (or Communication) Within Network Coverage

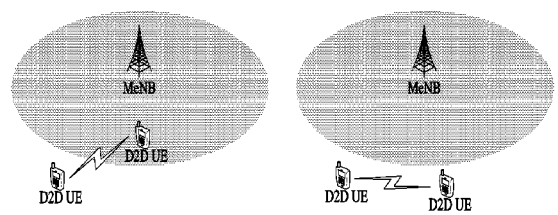

(b) D2D Discovery (or Communication) Outside Network Coverage

(56) References Cited

U.S. PATENT DOCUMENTS

2012/0265818 A1 10/2012 Phan et al.
2013/0107757 A1* 5/2013 Cherian .............. H04W 48/16
                                                    370/255

OTHER PUBLICATIONS

PCT International Application No. PCT/KR2013/011948, Written Opinion of the International Searching Authority dated Apr. 9, 2014, 16 pages.

* cited by examiner

E-UMTS (a) Control-plane protocol stack (b) User-plane protocol stack (a)

(b)

(a) D2D Discovery (or Communication) Within Network Coverage (b) D2D Discovery (or Communication) Outside Network Coverage ⇒ UE #0's Discovery Signal including "(X, Y, Z) = (ON, UE #0's ID, UE #2's ID)"
⇒ UE #1's Discovery Signal including "(X, Y, Z) = (OFF, UE #1's ID, NULL)"
⇒ UE #2's Discovery Signal including "(X, Y, Z) = (OFF, UE #2's ID, NULL)"

<UE #0's New ID Generation>

⇒ UE #0's Discovery Signal including "(X, N) = (ON, New ID)"

⇒ UE #0's Discovery Signal using "Resource Set #T"
⇒ UE #1's Discovery Signal using "Resource Set #F"

SIGNAL TRANSMISSION METHOD AND DEVICE FOR DEVICE-TO-DEVICE (D2D) IN WIRELESS COMMUNICATION SYSTEM

CROSS-REFERENCE TO RELATED APPLICATIONS

This application is the National Stage filing under 35 U.S.C. 371 of International Application No. PCT/KR2013/011948, filed on Dec. 20, 2013, which claims the benefit of U.S. Provisional Application Nos. 61/740,446, filed on Dec. 20, 2012 and 61/751,248, filed on Jan. 10, 2013, the contents of which are all hereby incorporated by reference herein in their entirety.

TECHNICAL FIELD

The present invention relates to a wireless communication system and, more specifically, to a signal transmission method for D2D communication in a wireless communication system and a device therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

A UE reports current channel status information to a base station periodically and/or aperiodically in order to assist in efficient operation of a wireless communication system. Since the reported channel status information may include results calculated in consideration of various situations, a more efficient reporting method is needed.

DISCLOSURE

Technical Problem

An object of the present invention devised to solve the problem lies in a signal transmission method for D2D communication in a wireless communication system and a device therefor.

The technical problems solved by the present invention are not limited to the above technical problems and those skilled in the art may understand other technical problems from the following description.

Technical Solution

To solve the aforementioned problems, in an aspect of the present invention, a method for transmitting a discovery signal by a first User Equipment (UE) for device-to-device (D2D) communication in a wireless communication system includes: the first UE transmitting a discovery signal for identifying a second UE for D2D communication, wherein the discovery signal includes information related to presence or absence of D2D data for D2D communication.

The discovery signal may include at least one of an indicator for indicating presence or absence of the D2D data, an identifier of a UE transmitting the D2D data, and an identifier of a UE receiving the D2D data.

At least one of the identifier of the UE transmitting the D2D data and the identifier of the UE receiving the D2D data may be set to a predetermined value when the indicator indicates absence of the D2D data. The identifier set to the predetermined value may be regarded as a virtual cyclic redundancy check (CRC).

The discovery signal may include a virtual identifier. The virtual identifier may be determined on the basis of the identifier of the first UE and the identifier of the second UE.

The discovery signal may further include information on a compression level of the identifier of the UE transmitting the D2D data and information on a compression level of the identifier of the UE receiving the D2D data.

The discovery signal may include information on a first compression level for the identifier of the UE transmitting the D2D data and information on a second compression level for the identifier of the UE receiving the D2D data. The first compression level may be set to be higher than the second compression level.

The discovery signal may be configured such that a D2D discovery signal format differently defined according to presence or absence of D2D data for D2D communication is used.

The discovery signal may be allocated to a resource region differently according to presence or absence of D2D data for D2D communication and transmitted.

The discovery signal may further include status information related to a reception mode of the D2D data. The status information may be composed of total time for which the reception mode of the D2D data is maintained or a start time and end time of the reception mode of the D2D data.

To solve the aforementioned problems, in another aspect of the present invention, a first UE configured to transmit a discovery signal for D2D communication in a wireless communication system includes: a radio frequency unit; and a processor, wherein the processor is configured to transmit a discovery signal for identifying a second UE for D2D communication, wherein the discovery signal includes information related to presence or absence of D2D data for D2D communication.

Advantageous Effects

According to embodiments of the present invention, signal transmission for D2D communication can be efficiently performed in a wireless communication system.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

Figure 1:
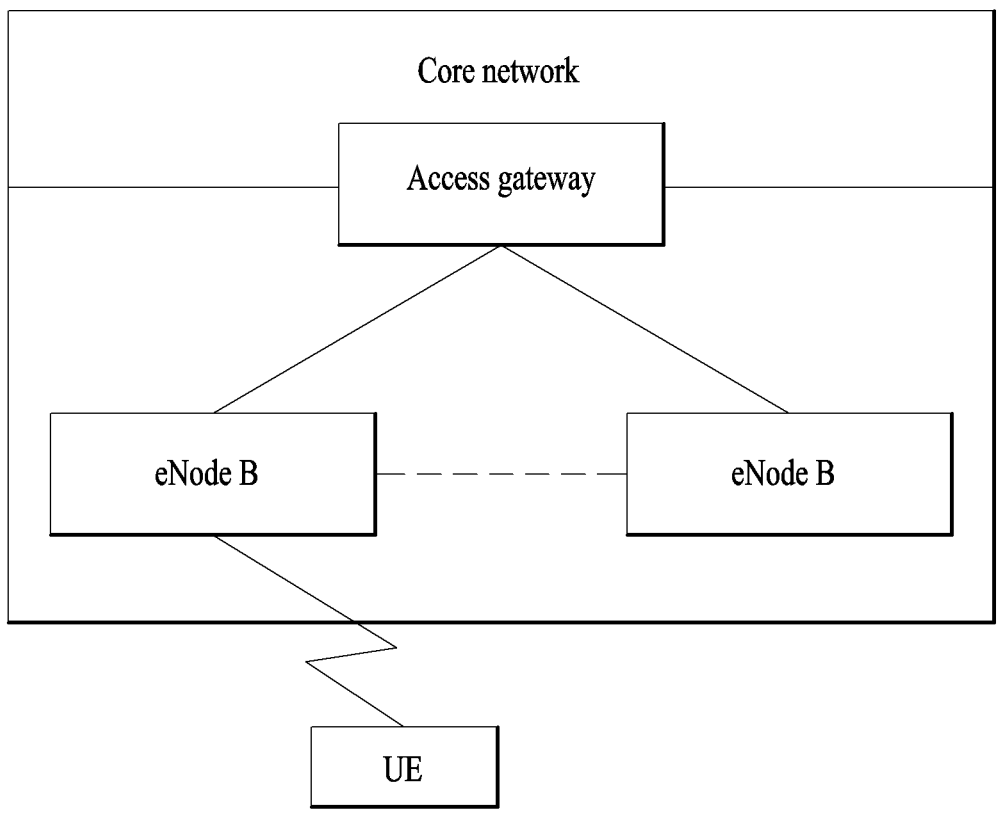
FIG. 1 illustrates an E-UMTS network structure as an exemplary mobile communication system.
Figure 2:
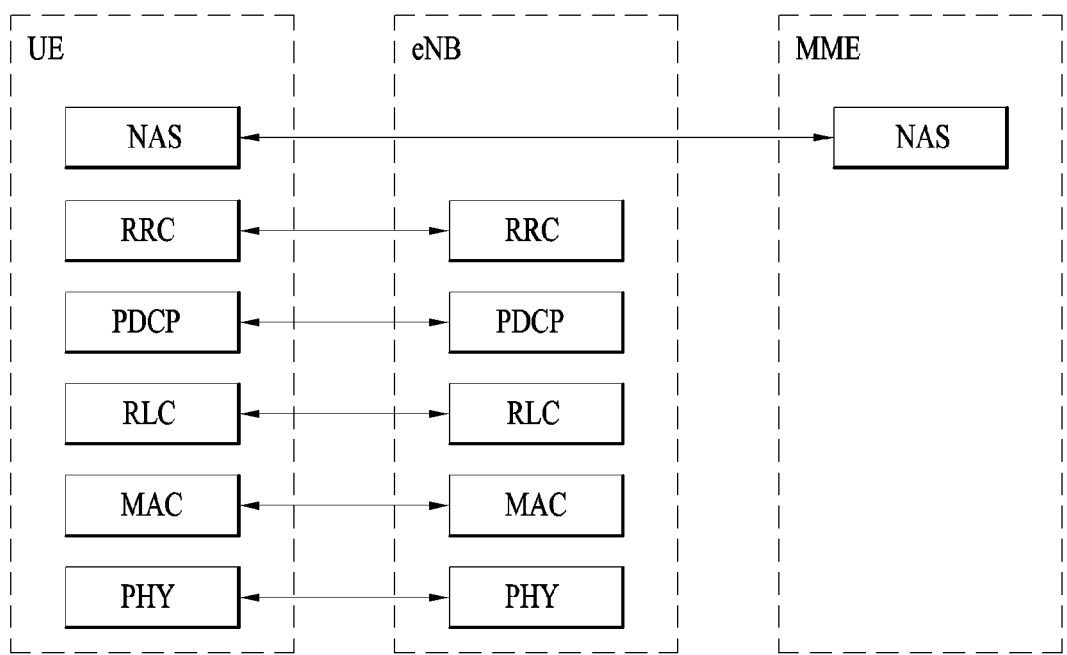
FIG. 2 illustrates structures of a control plane and a user plane of a radio interface protocol between a UE and an E-UTRAN based on a 3GPP wireless access network.
Figure 2:
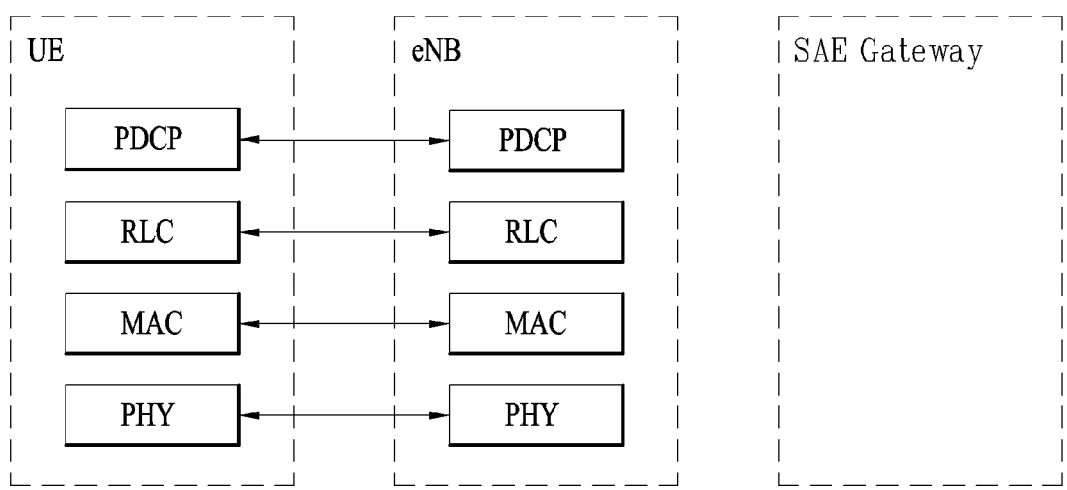

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
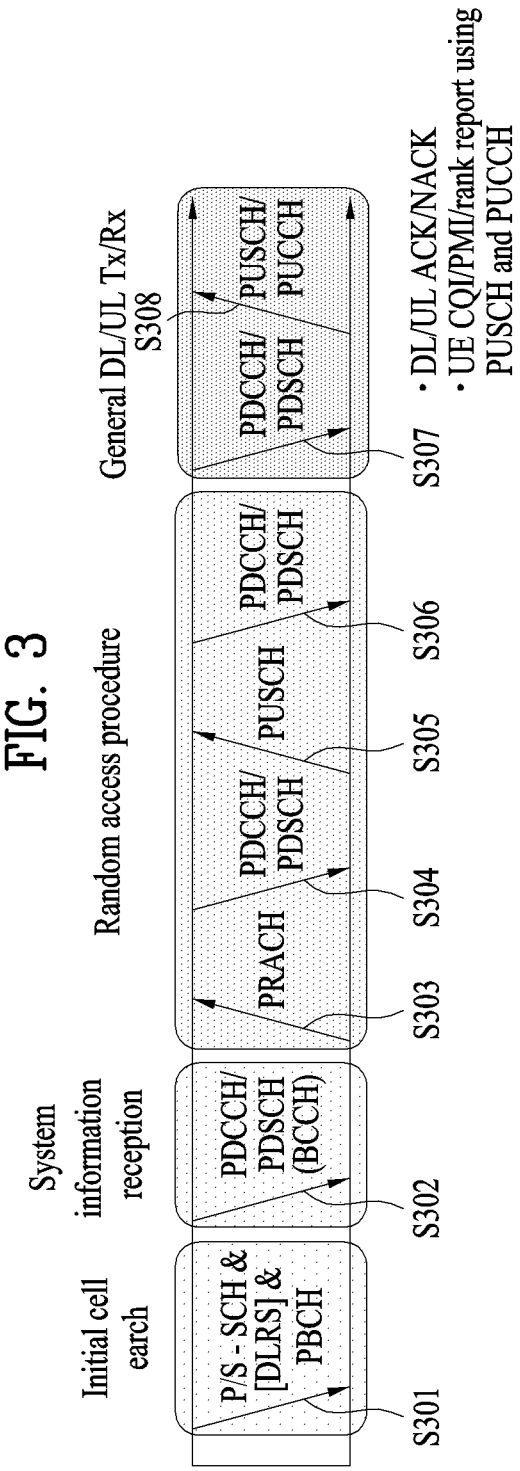
FIG. 3 illustrates physical channels used in a 3GPP system and a general signal transmission method using the same.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
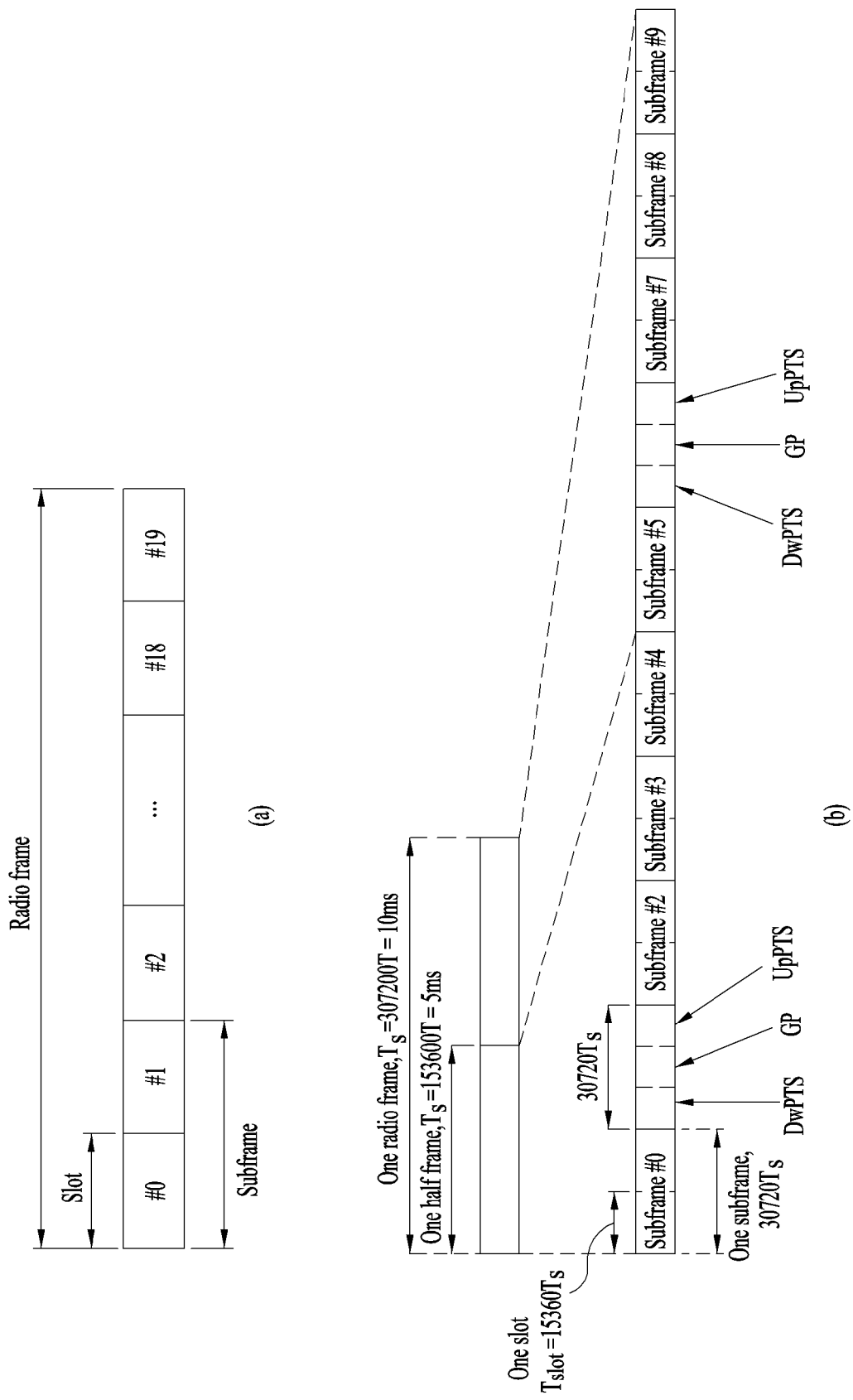
FIG. 4 illustrates a radio frame structure used in LTE.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000\times2048)$, and the other region is configured for the guard period.

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
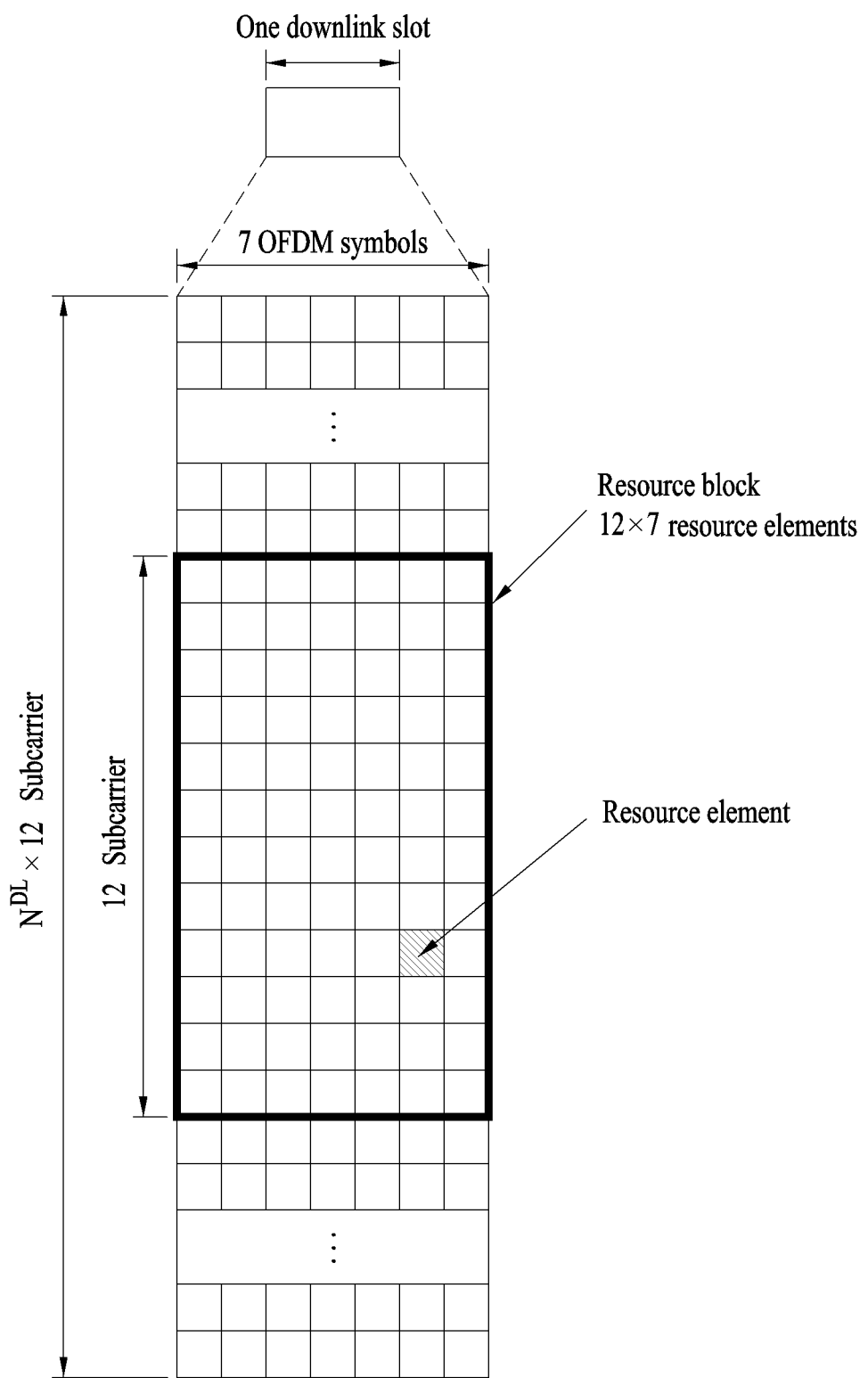
FIG. 5 illustrates a resource grid for a downlink slot.

FIG. 5 is a diagram illustrating a resource grid of a downlink slot.

Referring to FIG. 5, the downlink slot includes a plurality of $N_{symb}^{DL}$ OFDM symbols in a time domain and a plurality of $N_{RB}^{DL}$ blocks in a frequency domain. Since each resource block includes $N_{sc}^{RB}$ subcarriers, the downlink slot includes $N_{RB}^{DL} \times N_{sc}^{RB}$ subcarriers in the frequency domain. Although FIG. 5 illustrates that the downlink slot includes seven OFDM symbols and the resource block includes twelve subcarriers, it is to be understood that the downlink slot and the resource block are not limited to the example of FIG. 5. For example, the number of OFDM symbols included in the downlink slot may be varied depending on the length of the CP.

Each element on the resource grid will be referred to as a resource element (RE). One resource element is indicated by one OFDM symbol index and one subcarrier index. One RB includes $N_{symb}^{DL} \times N_{sc}^{RB}$ number of resource elements. The

TABLE 1

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — | number $N_{RB}^{DL}$ of resource blocks included in the downlink slot depends on a downlink transmission bandwidth configured in the cell.

Figure 6:
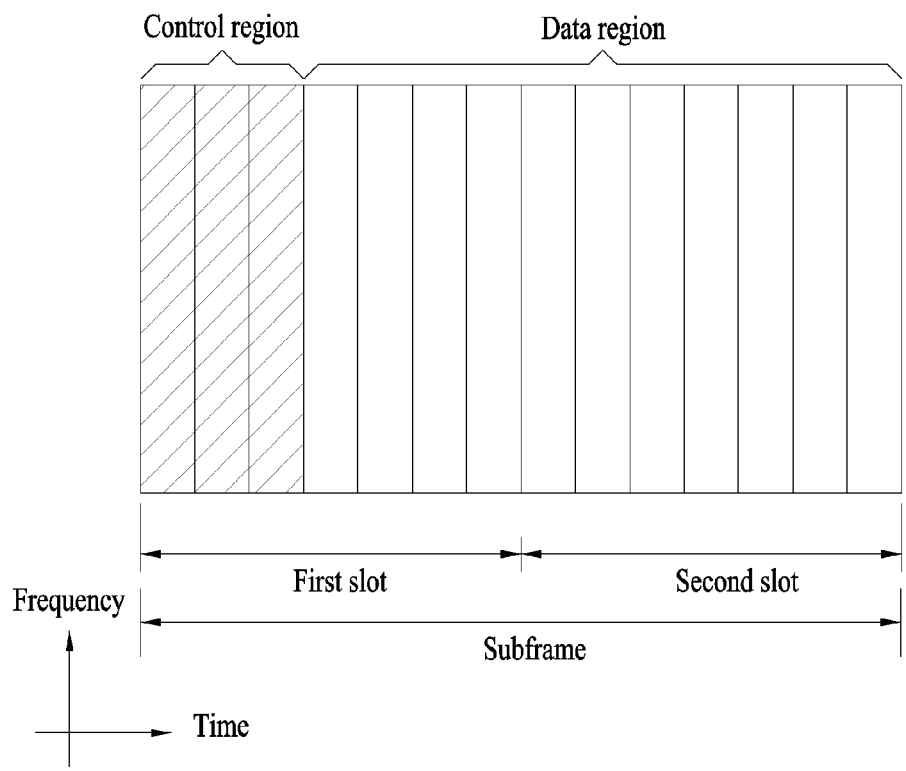
FIG. 6 illustrates a downlink radio frame structure used in LTE.

FIG. 6 is a diagram illustrating a structure of a downlink subframe.

Referring to FIG. 6, maximum three (four) OFDM symbols located at the front of the first slot of the subframe correspond to a control region to which a control channel is allocated. The other OFDM symbols correspond to a data region to which a physical downlink shared channel (PDSCH) is allocated. Examples of downlink control channels used in the LTE system include a Physical Control Format Indicator Channel (PCFICH), a Physical Downlink Control Channel (PDCCH), and a Physical Hybrid ARQ Indicator Channel (PHICH). The PCFICH is transmitted from the first OFDM symbol of the subframe, and carries information on the number of OFDM symbols used for transmission of the control channel within the subframe. The PHICH carries HARQ ACK/NACK (Hybrid Automatic Repeat reQuest acknowledgement/negative-acknowledgement) signals in response to uplink transmission.

The control information transmitted through the PDCCH will be referred to as downlink control information (DCI). The DCI includes resource allocation information for a user equipment or user equipment group. For example, the DCI includes uplink/downlink scheduling information, uplink transmission (Tx) power control command, etc.

The PDCCH may include transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission (Tx) power control commands of individual user equipments (UEs) within a random user equipment group, transmission (Tx) power control command, and activity indication information of voice over Internet protocol (VoIP). A plurality of PDCCHs may be transmitted within the control region. The user equipment may monitor the plurality of PDCCHs. The PDCCH is transmitted on aggregation of one or a plurality of continuous control channel elements (CCEs). The CCE is a logic allocation unit used to provide the PDCCH with a coding rate based on the status of a radio channel. The CCE corresponds to a plurality of resource element groups (REGs). The format of the PDCCH and the number of available bits of the PDCCH are determined depending on the number of CCEs. The base station determines a PDCCH format depending on the DCI which will be transmitted to the user equipment, and attaches cyclic redundancy check (CRC) to the control information. The CRC is masked with an identifier (for example, radio network temporary identifier (RNTI)) depending on usage of the PDCCH or owner of the PDCCH. For example, if the PDCCH is for a specific user equipment, the CRC may be masked with cell-RNTI (C-RNTI) of the corresponding user equipment. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI).

Figure 7:
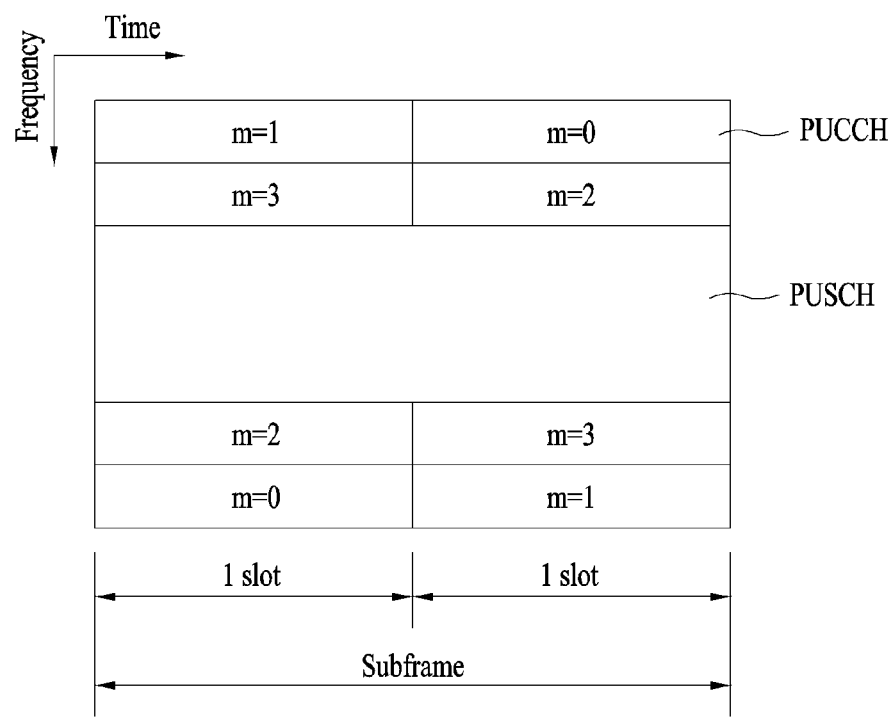
FIG. 7 illustrates an uplink subframe structure used in LTE.

FIG. 7 illustrates an uplink subframe structure used in LTE.

Referring to FIG. 7, an uplink subframe includes a plurality of (e.g. 2) slots. A slot can include different numbers of SC-FDMA symbols according to CP length. The uplink subframe is divided into a data region and a control region in the frequency domain. The data region includes a PUSCH and is used to transmit a data signal such as voice. The control region includes a PUCCH and is used to transmit uplink control information (UCI). The PUCCH includes an RB pair located at both ends of the data region in the frequency domain, which is frequency-hopped at a slot boundary.

The PUCCH can be used to transmit the following control information.

SR (Scheduling Request): SR is information used to request an uplink UL-SCH resource. This information is transmitted using OOK (On-Off Keying).

HARQ ACK/NACK: This is a response signal for a downlink data packet on a PDSCH. This information represents whether the downlink data packet has been successfully received. 1-bit ACK/NACK is transmitted in response to a single downlink codeword and 2-bit ACK/NACK is transmitted in response to two downlink codewords.

CSI (Channel State Information): This is feedback information on a downlink channel. The CSI includes a CQI (Channel Quality Indicator) and MIMO (Multiple Input Multiple Output) related feedback information includes an RI (Rank Indicator), a PMI (Precoding Matrix Indicator), a PTI (Precoding Type Indicator) and the like. 20 bits are used per subframe.

The quantity of control information (UCI) that a UE can transmit in a subframe depends on the number of SC-FDMA symbols available for control information transmission. The SC-FDMA symbols available for control information transmission refer to remaining SC-FDMA symbols except SC-FDMA symbols for reference signal transmission in the subframe. In the case of a subframe for which an SRS (Sounding Reference Signal) is configured, even the last SC-FDMA symbol of the subframe is excluded. A reference signal is used for coherent detection of the PUCCH.

A description will be given of D2D (UE-to-UE) communication.

D2D communication can be classified into a method assisted by a network/coordination station (e.g., base station) and a method that is not assisted.

Figure 8:
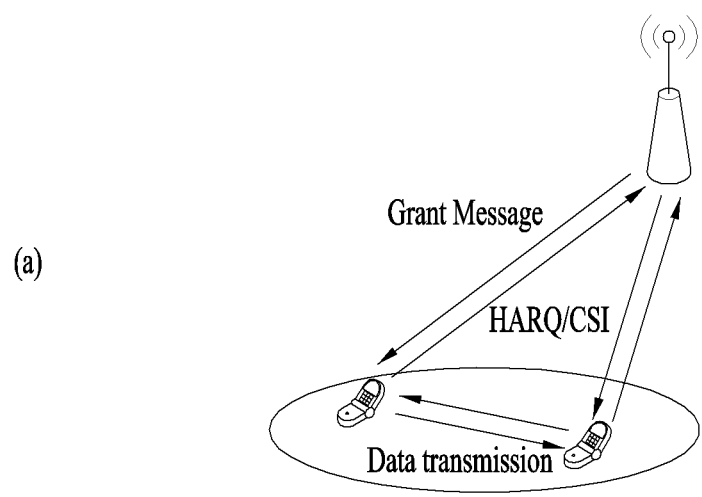
FIG. 8 is a view for explaining D2D (UE-to-UE) communication.
Figure 8:
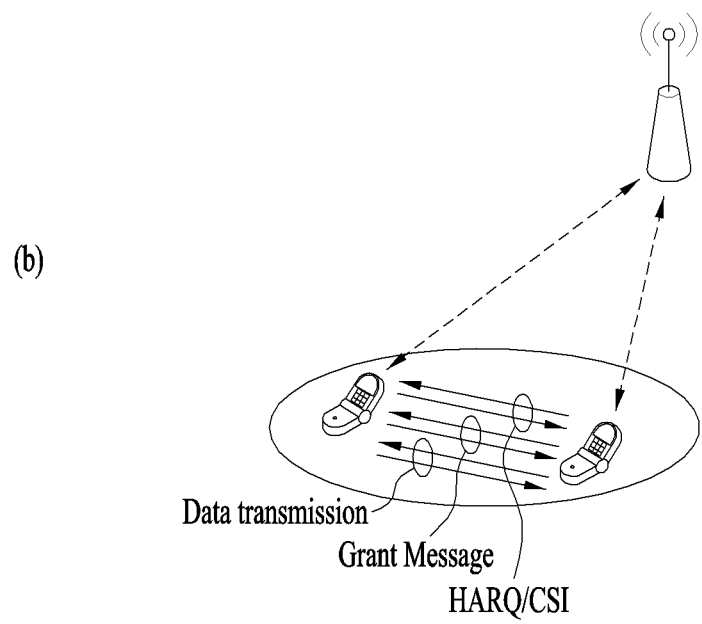

FIG. 8(a) illustrates a method in which the network/coordination station intervenes in transmission and reception of a control signal (e.g., a grant message), HARQ, channel state information and the like and only data transmission/reception is performed between UEs that perform D2D communication. FIG. 8(b) illustrates a method in which a network provides only minimum information (e.g., D2D connection information available in a corresponding cell) and UEs that perform D2D communication establish links and perform data transmission and reception.

The present invention provides various D2D procedures and signal configurations necessary to efficiently perform D2D communication (i.e. UE-to-UE communication).

Methods proposed by the present invention will be described on the basis of 3G LTE for convenience of description. However, the range of systems to which the present invention is applicable can be extended to systems other than 3GPP LTE. In addition, the methods proposed by the present invention can be extended and applied to a case in which D2D communication is performed on the basis of part of time/frequency resource regions of existing systems and/or a case in which new time/frequency resources are allocated for D2D communication and D2D communication is performed using the new time/frequency resources.

D2D communication described in the present invention can be divided into two stages. The first stage is the "discovery stage" in which a specific D2D UE transmits a pre-defined discovery signal such that other D2D UEs can recognize proximity of the specific D2D UE. Here, a sequence of the discovery signal transmitted from the specific D2D UE can be generated on the basis of the identifier (ID) of the specific D2D UE or a pre-defined new identifier (new ID).

The second stage is the "communication stage" including a step in which the specific D2D UE performs D2D data communication with a desired D2D UE on the basis of a list of neighboring D2D UEs detected through the discovery stage, various preceding steps (e.g., D2D link establishment, that is, time/frequency synchronization, MCS, power control and the like) necessary to perform D2D data communication and the like.

Here, the specific D2D UE can detect presence or absence of D2D transmission/reception data of the specific D2D UE or other UEs through the communication stage. Accordingly, when D2D transmission/reception data is present, D2D data transmission/reception operation may be performed or not on the basis of the information on presence or absence of D2D transmission/reception data.

The aforementioned D2D discovery operation or D2D data communication may be implemented in various environments, typically, D2D Discovery Within Network Coverage, D2D Communication Within Network Coverage, D2D Discovery Outside Network Coverage (for Public Safety Only), D2D Discovery Outside Network Coverage (for Public Safety Only) and the like.

Figure 9:
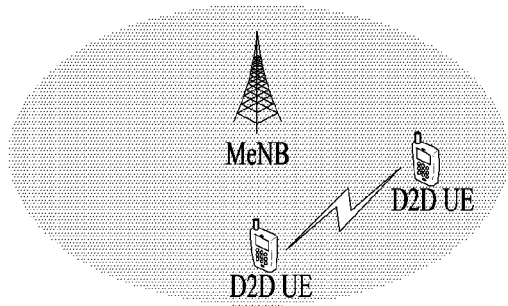
FIG. 9 illustrates cases in which D2D discovery operation of D2D data communication is performed.
Figure 9:
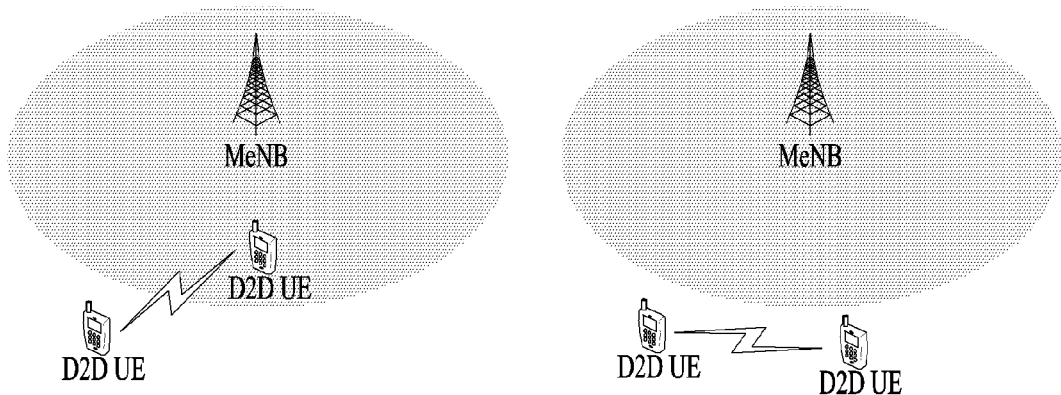

FIG. 9 shows cases in which D2D discovery operation or D2D data communication is performed.

FIG. 9(a) illustrates a case in which all UEs participating in D2D communication are located in the communication range of a network and FIG. 9(b) illustrates a case in which all or some UEs participating in D2D communication are located outside the network communication range. Different D2D discovery operations or different signal information configurations and operation procedures for D2D communication may be respectively defined for the cases of FIG. 9.

When a specific D2D UE detects presence or absence of D2D transmission/reception data of other D2D UEs or notifies other D2D UEs of presence or absence of D2D transmission/reception data thereof, some steps of the "communication stage" need to be performed.

However, the present invention provides a method for UEs participating in D2D communication "to detect presence or absence of D2D transmission/reception data of other UEs" and/or "to indicate presence or absence of D2D transmission/reception data thereof" through a pre-defined rule or signal in the "discovery stage". That is, in the discovery stage, UEs participating in D2D communication according to the present invention detect presence or absence of D2D transmission/reception data thereof or recognize whether to perform the procedure of detecting presence or absence of the D2D transmission/reception data thereof in the communication stage. Accordingly, it is possible to prevent unnecessary execution of the communication stage (or some steps of the communication stage) after the discovery stage.

Accordingly, the UEs participating in D2D communication according to the present invention can skip one of i) the communication stage, ii) some pre-defined procedures in the communication stage and iii) a D2D communication link setup procedure after a specific pre-defined step in the communication stage in at least one of a case in which D2D transmission/reception data of other UEs is not present and a case in which D2D transmission/reception data of corresponding specific D2D UE is not present, thereby achieving efficient power management of UEs and simplified D2D communication.

According to an embodiment, the UEs participating in D2D communication according to the present invention may be configured to include, in a discovery signal, information "for detecting presence or absence of D2D transmission/reception data of other UEs" and/or "for indicating presence or absence of D2D transmission/reception data thereof" and to transmit the discovery signal. Here, the signal for D2D discovery refers to a signal transmitted by UEs participating in D2D communication in order to detect or indicate presence or absence thereof (within a predefined specific range). In addition, specific information may be included in the signal for D2D discovery in various manners in the present invention. For example, specific information can be included in the D2D discovery signal using a scrambling or embedded method.

UEs can perform D2D discovery operation and, simultaneously, detect presence or absence of D2D transmission/reception data thereof through the aforementioned method proposed by the present invention. In addition, when D2D transmission/reception data of a specific UE is not present and/or when D2D transmission/reception data of other UEs is not present, the specific UE can skip i) the communication stage, ii) predefined procedures in the communication stage or iii) a D2D communication link setup procedure after a predefined specific step of the communication stage, thereby achieving efficient power management or simplified D2D communication.

In embodiments of the present invention, information included in the signal for D2D discovery and transmitted may be configured to include at least one of the following information items. While different configurations of information, which is included in the D2D discovery signal and transmitted, are respectively described for a case in which D2D transmission data is present for one UE and a case in which D2D reception request data is present for one UE in the following, the present invention can also be applied to a case in which the information is commonly configured for D2D transmission data and D2D reception data without discriminating D2D transmission data from D2D reception data.

Figure 10:
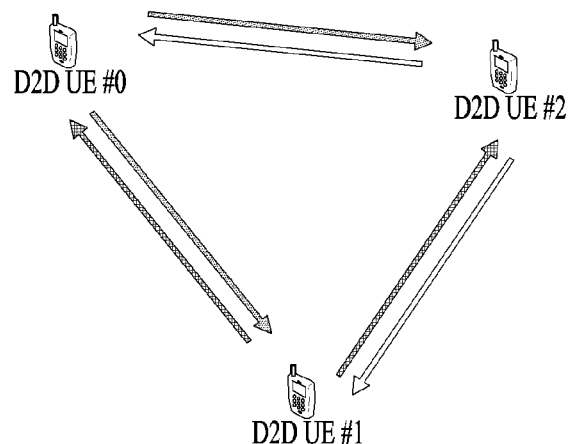
FIG. 10 illustrates a case in which a D2D discovery signal including information on presence or absence of D2D data is transmitted according to an embodiment of the present invention.

Examples of Information Included in the Signal for D2D Discovery and Transmitted An indicator for indicating presence or absence of D2D transmission data At least one of the identifier (ID) of a D2D UE that transmits D2D data and the ID of a D2D UE that receives the D2D data An indicator for indicating presence or absence of D2D data that needs to be received from a specific UE The ID of a UE that requests D2D data reception from a specific UE and/or the ID of a D2D UE that transmits the corresponding D2D data FIG. 10 illustrates a case in which information on presence or absence of D2D data is included in the signal for D2D discovery and transmitted according to an embodiment of the present invention. It is assumed that three UEs (e.g., D2D UE #0, D2D UE #1 and D2D UE #2) participate in D2D communication in FIG. 10. For convenience of description, the information included in the D2D discovery signal is represented as (X, Y, Z). Here, X indicates a state indicator that indicates whether a D2D UE has D2D data to be transmitted to a specific D2D UE and is represented as ON/OFF according to presence or absence of D2D transmission data. When a plurality of D2D discovery signal formats is defined and different D2D discovery signal formats are used according to predetermined purposes/usages, the field X may be configured to be used as an indicator field for indicating the type of a (selected) D2D discovery signal format. Y and Z respectively refer to the ID of a D2D UE that transmits D2D data and the ID of a D2D UE that receives the D2D data.

For example, D2D UE #0 has D2D data to be transmitted to D2D UE #2 and thus D2D UE #0 includes information "(X, Y, Z)=(ON, UE #0's ID, UE #2's ID)" in the D2D discovery signal and transmits the D2D discovery signal including the information in FIG. 10. D2D UEs having no D2D transmission data can set Z, which refers to the ID of a D2D data receiving UE, from among the information (i.e., (X, Y, Z)) included in the D2D discovery signal and transmitted, to a specific value or an ID of a specific value (or the IDs thereof) according to a predefined rule. For example, D2D UE #1 and D2D UE #2 do not currently have D2D transmission data although D2D UE #1 and D2D UE #2 transmit the D2D discovery signal, and thus D2D UE #1 and D2D UE #2 respectively include "(X, Y, Z)=(OFF, UE #1's ID, NULL)" and "(X, Y, Z)=(OFF, UE #2's ID, NULL)" in the D2D discovery signal and transmit the D2D discovery signal. Here, NULL can be defined to indicate that predefined K bits have specific values.

Alternatively, D2D UEs having no D2D transmission data may set Z, which refers to the ID of a D2D data receiving UE, from among the information (i.e., (X, Y, Z)) included in the D2D discovery signal and transmitted, to a specific value according to a predefined rule, and Z may be used for a virtual CRC. For example, Z set to a specific value and used for a virtual CRC is preferably set to a value known to both a D2D transmission UE and a D2D reception UE. Additionally, information on Z having a specific value may be signaled by a BS to UEs through predefined higher layer/physical layer signaling or determined through exchange of a predefined signal between UEs.

Alternatively, D2D UEs having no D2D transmission data may be configured to omit or exclude Z, which refers to the ID of a D2D data receiving UE, from among the information (i.e., (X, Y, Z)) included in the D2D discovery signal and transmitted, and to transmit information taking the form of (X, Y). For example, the information having the form of (X, Y) can be defined to have the same length as the information taking the form of (X, Y, Z). In this case, the information taking the form of (X, Y) can enable more accurate transmission of the ID of the D2D transmission UE (e.g., relatively low coding rate), compared to the information (X, Y, Z).

In FIG. 10, D2D UE #1 can recognize that D2D reception data therefor is not currently present by i) receiving D2D discovery signals transmitted from D2D UE #0 and D2D UE #2 and/or ii) decoding information on presence or absence of D2D transmission data included in the D2D discovery signals and transmitted, in the discovery stage. Accordingly, D2D UE #1 can skip i) the communication stage, ii) predefined procedures in the communication stage or iii) the D2D communication link setup procedure after a predefined specific step in the communication stage according to a predefined configuration. D2D UE #2 can recognize that D2D UE #0 currently has D2D data to be transmitted thereto by i) receiving D2D discovery signals transmitted from D2D UE #0 and D2D UE #1 and/or ii) decoding information on presence or absence of D2D transmission data included in the D2D discovery signals and transmitted, in the discovery stage. Accordingly, D2D UE #2 receives the D2D data from D2D UE #0 through predefined procedures in the communication stage.

The D2D discovery signal including the information on presence or absence of D2D data according to another embodiment of the present invention will now be described with reference to FIG. 11.

In the embodiment described with reference to FIG. 10, the information included in the D2D discovery signal and transmitted may include the ID of a D2D UE that transmits D2D data and/or the ID of a D2D UE that receives the D2D data. However, when such IDs are included in the D2D discovery signal, complexity/overhead may be increased.

Accordingly, another embodiment of the present invention derives an ID (referred to as a new ID for convenience of description) which is newly defined on the basis of a predefined function (e.g., a random function or a hashing function) having the ID of a D2D UE that transmits D2D data and/or the ID of a D2D UE that receives the D2D data as factors. The derived new ID (which may be applied as a virtual ID used for D2D communication with respect to the new ID) may be included in the D2D discovery signal and transmitted. In addition, information on the predefined function may be signaled by a BS to UEs through predefined higher layer/physical layer signaling or determined through exchange of a predefined signal between UEs.

Accordingly, the new ID derived on the basis of the predefined function according to the present embodiment can have overhead (e.g. application of a compression scheme) lower than those of the ID of a D2D UE that transmits D2D data and/or the ID of a D2D UE that receives the D2D data, and thus overhead/complexity of information included in the D2D discovery signal and transmitted can be reduced.

In addition, the new ID, derived on the basis of the predefined function according to the present invention, may be configured to be used not only for D2D UEs to detect presence or absence of D2D data thereof in the D2D discovery stage but also for UEs that actually perform D2D data communication to perform D2D data communication on the basis of the new ID (after the D2D discovery stage).

Furthermore, operation of generating the new ID based on the predefined function according to the present invention can be extended and applied to i) a case in which multiple IDs of D2D reception/transmission UEs are present or ii) a case in which the number of UEs that simultaneously perform D2D (data) communication gradually increases (e.g., when one-to-one D2D communication is switched to one-to-many communication (e.g. group D2D communication) or one-to-one D2D communication is switched to many-to-one D2D communication). In this case, the new ID may be derived by inputting a plurality of D2D reception/transmission UE IDs as factors of the predefined function.

A description will be given of a case in which the new ID derived on the basis of the predefined function is included in the D2D discovery signal and transmitted with reference to FIG. 11. In FIG. 11, it is assumed that two UEs (e.g., D2D UE #0 and D2D UE #1) participate in D2D communication and only D2D UE #0 transmits the D2D discovery signal at a specific time for convenience of description. In addition, the information included in the D2D discovery signal and transmitted is represented as (X, N). Here, X refers to a state indicator for indicating that a D2D UE has D2D data to be transmitted to a specific D2D UE and can be represented as ON/OFF according to presence or absence of D2D transmission data. N indicates the new ID derived on the basis of the predefined function.

Figure 11:
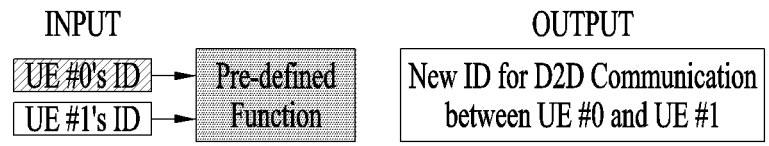
FIG. 11 illustrates a D2D discovery signal including information on presence or absence of D2D data according to another embodiment of the present invention.
Figure 11:
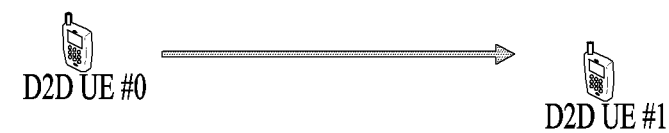

In FIG. 11, D2D UE #0 has D2D data to be transmitted to D2D UE #1, and thus D2D UE #0 inputs the ID thereof and the ID of D2D UE #1 as factors of the predefined function to generate a new ID. Then, D2D UE #0 can include information "(X, N)=(ON, New ID)" in the D2D discovery signal thereof and transmit the D2D discovery signal.

In another embodiment of the present invention, the ID of a D2D transmission UE and the ID of a D2D reception UE, from among information included in the D2D discovery signal and transmitted, can be compressed at different levels. This embodiment is efficient in the case of a D2D application through which a specific D2D UE generates D2D data upon discovery of a desired D2D UE in the discovery stage because transmission of the ID of the D2D transmission UE, which is directly associated with generation of D2D data, from among the information included in the D2D discovery signal and transmitted, may be more important than transmission of the ID of the D2D reception UE in the D2D application.

As an example of compressing the ID of the D2D transmission UE and the ID of the D2D reception UE at different levels, the ID of the D2D transmission UE can be compressed into (K−W1) bits and the ID of the D2D reception UE can be compressed into (K−W2) bits according to a predefined configuration when the IDs are K bits (K being a natural number). Here, the relationship of "W1<W2" (i.e., W1 and W2 are integers smaller than K) or the relationship of "W1<W2" (i.e., W1 and W2 are integers smaller than or equal to K) may be established.

Alternatively, when the IDs of the D2D transmission UE and the D2D reception UE are K bits, the ID of the D2D transmission UE may be transmitted as K bits (i.e., a compression scheme is not applied thereto) and the ID of the D2D reception UE may be compressed into (K−W2) bits. Here, W2 can be set to an integer smaller than or equal to K.

In addition, independent functions for respectively compressing the ID of the D2D transmission UE and the ID of the D2D reception UE or a common function for compressing the IDs may be defined. Furthermore, information (e.g. W1, W2 and a compression function) for compressing the ID of the D2D transmission UE and the ID of the D2D reception UE at different levels may be signaled by a BS to the UEs through predefined higher layer/physical layer signaling or determined through exchange of a predefined signal between UEs.

When the present invention is applied, a specific D2D UE may have D2D data to be transmitted to a plurality of other D2D UEs at a specific time. For example, i) a plurality of D2D UEs can be configured to receive D2D data transmitted from the specific D2D UE (i.e., group D2D communication), ii) a plurality of D2D applications can be simultaneously executed in the specific D2D and a plurality of D2D UEs can be configured to receive one piece of D2D data transmitted from the specific D2D UE at a specific time or iii) a plurality of D2D applications can be simultaneously executed in the specific D2D and a plurality of D2D UEs can be configured to receive multiple pieces of D2D data transmitted from the specific D2D UE at a specific time. In this case, the specific D2D UE can be configured to notify other D2D UEs participating in D2D communication of i) information representing that the specific D2D UE has D2D transmission data although the specific D2D UE cannot designate one D2D reception UE and/or ii) information representing that the specific D2D UE has D2D data to be transmitted to a plurality of other D2D UEs, by setting the ID of the D2D reception UE or an ID related field of the D2D reception UE, from among information included in the D2D discovery signal and transmitted, to a specific value according to a predefined configuration in embodiments of the present invention.

For example, setting the ID of the D2D reception UE or an ID related field of the D2D reception UE, from among information included in the D2D discovery signal and transmitted, to a specific value (or a specific state) by the specific D2D UE according to the aforementioned method can be interpreted as intention of the specific D2D UE to be connected with all other D2D UEs, which are potential D2D communication targets, to perform communication. Information on the ID of the D2D reception UE, set to a specific value (or a specific state) indicating that the specific D2D UE has D2D data to be transmitted to a plurality of D2D UEs, may be signaled by the BS to UEs through predefined higher layer/physical layer signaling or determined through exchange of a predefined signal between UEs.

The present invention may predefine a D2D discovery signal format having a predetermined length. Accordingly, the D2D discovery signal format may be defined differently according to presence or absence of D2D transmission data.

Figure 12:
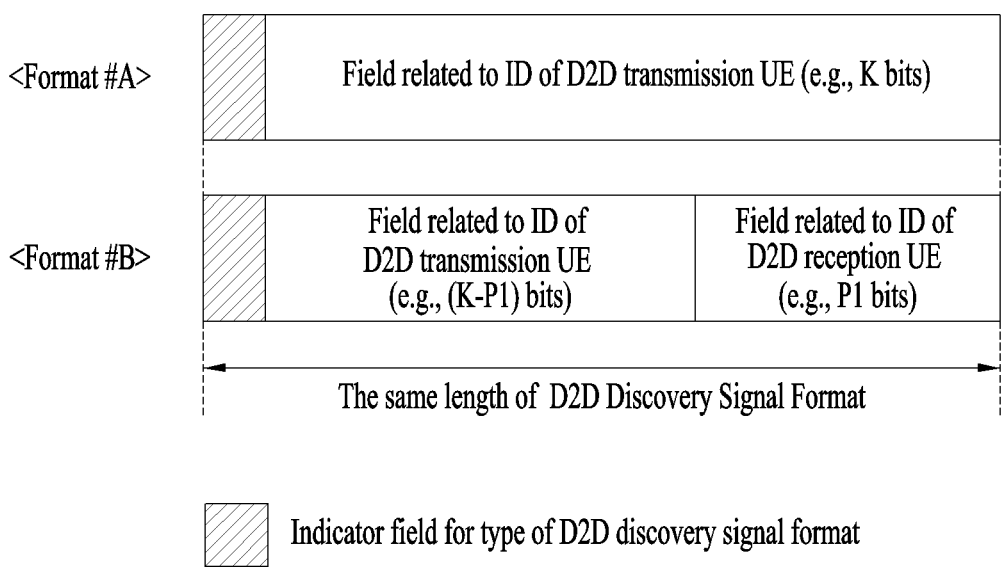
FIG. 12 is a view for explaining D2D discovery signal formats having different lengths (or sizes), proposed by the present invention.

FIG. 12 is a view for explaining D2D discovery signal formats having different lengths (sizes) proposed by the present invention.

For example, when a specific UE does not have D2D transmission data, the specific UE can be configured to use D2D discovery signal format #A. Here, D2D discovery signal format #A can be composed of i) an indicator field for indicating the type of the D2D discovery signal format and/or ii) a field related to the ID of a D2D transmission UE. When a specific UE has D2D transmission data, the specific UE can be configured to use D2D discovery signal format #B. Here, D2D discovery signal format #B can be composed of i) an indicator field for indicating the type of the D2D discovery signal format, ii) a field related to the ID of a D2D transmission UE and/or iii) a field related to the ID of a D2D reception UE. In addition, the field related to the ID of a D2D reception UE in D2D discovery signal format #B can be set to use extra bits generated when the field related to the ID of a D2D transmission UE in D2D discovery signal format #A is compressed at a predefined level.

According to the present invention, different D2D discovery signal formats may be used according to whether D2D communication for advertisement is performed or not. For example, when D2D communication for advertisement is performed, D2D discovery signal format #A can be used along with additionally defined information or an indicator for indicating whether D2D communication for advertisement is performed because the field related to the ID of a D2D reception UE for indicating presence or absence of D2D transmission data may not be necessarily needed since the possibility that data transmission is performed all the time in D2D communication for advertisement is high. Conversely, when D2D communication for advertisement is not performed, D2D discovery signal format #B can be used. In this case, the corresponding D2D discovery signal can be considered to be transmitted by a specific UE in order to perform D2D communication for a general purpose (e.g., D2D communication between neighboring UEs).

In addition, different D2D discovery signal formats may be used according to types of D2D applications executed in a D2D UE. For example, when a D2D application for simple discovery is used, D2D discovery signal format #A can be used since transmission and discovery of the ID of a D2D transmission UE are most important.

Furthermore, a field (e.g. X of FIG. 10) for indicating presence or absence of D2D transmission data may be additionally defined in addition to the indicator field indicating the type of a D2D discovery signal format or the indicator field indicating the type of a D2D discovery signal format may be configured to be (re-) regarded as information on presence or absence of D2D transmission data.

A description will be given of an embodiment with respect to fields of D2D discovery signal format #A and D2D discovery signal format #B with reference to FIG. 12. In FIG. 12, it is assumed that extra bits, generated when a K-bit field related to the ID of a D2D transmission UE is compressed at a predefined level, are (K−P1) bits, and thus a field related to the ID of a D2D reception UE in D2D discovery signal format #B becomes P1 bits (i.e., P1=K−(K−P1)). Here, information (e.g., P1 and a compression function) for compressing the field related to the ID of the D2D transmission UE may be signaled by a BS to UEs through predefined higher layer/physical layer signaling or determined through exchange of a predefined signal between UEs.

When a specific UE uses D2D discovery signal format #A, it is possible to notify other D2D UEs of the correct ID of the D2D transmission UE, compared to a case in which the specific UE uses D2D discovery signal format #B. Conversely, when a specific UE uses D2D discovery signal format #B, performance of transmitting the ID of the D2D transmission UE may be deteriorated, compared to a case in which the specific UE uses D2D discovery signal format #A, but the specific UE can notify other D2D UEs receiving D2D discovery signal format #B of information about whether the communication stage for (Actual) D2D data communication is needed. Alternatively, when D2D discovery signal format #B is used, a more accurate discovery confirmation procedure may be additionally performed in the communication stage.

According to embodiments of the present invention, UEs participating in D2D communication can include information on presence or absence of D2D transmission/reception data thereof and/or information on presence or absence of D2D transmission/reception data of other UEs in D2D discovery signals according to a predetermined configuration and transmit the D2D discovery signals including the information in order to recognize presence or absence of D2D transmission/reception data of other UEs and/or to notify other UEs of presence or absence of D2D transmission/reception data thereof. However, a D2D UE may regard the D2D discovery signal as different signals according to resources (e.g., resources in the time/frequency domain or a sequence/code resource) in which the D2D discovery signal is transmitted, in another embodiment of the present invention. That is, the type of a resource set in which the D2D discovery signal is transmitted can be (implicitly) regarded as information indicating information on the D2D discovery signal.

In the present invention, a resource used to transmit the D2D discovery signal can be configured in the form of a combination of i) time, ii) a frequency and/or iii) a sequence, and a resource set used to transmit the D2D discovery signal can be set according to presence or absence of D2D data. Accordingly, UEs participating in D2D communication can recognize presence or absence of D2D transmission/reception data according to types of resource sets in which D2D discovery signals thereof are transmitted/detected (or resource positions). Furthermore, i) a resource in which the D2D discovery signal is transmitted and/or ii) information on presence or absence of D2D transmission/reception data, which is associated with the resource, may be signaled by a BS to UEs through predefined higher layer/physical layer signaling or determined through exchange of a predefined signal between UEs.

Figure 13:
FIG. 13 illustrates a case in which information on presence or absence of D2D data is detected according to resources in which a signal for D2D discovery is transmitted.

FIG. 13 illustrates a case in which information on presence or absence of D2D data is detected according to a resource in which the D2D discovery signal is transmitted. In FIG. 13, it is assumed that two UEs (e.g., D2D UE #0 and D2D UE #1) participate in D2D communication. In addition, it is assumed that a specific UE transmits the D2D discovery signal using resource set #T when the specific UE has D2D data to be transmitted and transmits the D2D discovery signal using resource set #F when the specific UE does not have D2D data to be transmitted for convenience of description.

Accordingly, D2D UE #0 transmits the D2D discovery signal using resource set #T since D2D UE #1 has D2D transmission data whereas D2D UE #1 transmits the D2D discovery signal using resource set #F since D2D UE #1 does not have D2D transmission data in FIG. 13.

In addition, the present invention can include, in the D2D discovery signal, not only i) information regarding presence or absence of D2D transmission/reception data and/or ii) IDs of UEs transmitting/receiving D2D data but also iii) information on a time for which a UE, which is a target of the D2D discovery signal, needs to maintain a reception mode state (for D2D data communication link setup and D2D data communication, for example). When the information on a time for which a UE, which is a target of the D2D discovery signal, needs to maintain a reception mode state is additionally included in the D2D discovery signal, as described above, it is possible to prevent collision of D2D discovery signals between D2D UEs or to reduce an unnecessary reception mode maintenance time of a specific D2D UE that has received information on presence of D2D transmission/reception data of another D2D UE.

Information on a reception mode state maintenance time, included in the D2D discovery signal and transmitted, may be configured such that the information is used only for a UE that detects i) information on presence of D2D transmission/reception data from another UE and/or ii) the ID thereof from the D2D discovery signal in one-to-one D2D communication. Otherwise, the information may be configured to be used only for a UE that detects i) information on presence of D2D transmission/reception data from another UE and/or ii) a predefined (or signaled) group ID thereof from the D2D discovery signal in one-to-many D2D communication or group D2D communication.

In addition, information on a time for which a UE, which is a target of the D2D discovery signal, needs to maintain a reception mode state may be composed of i) total time $T_{Total}$ for which the reception mode state is maintained or ii) a start time TSTART and an end time TEND of the reception mode state if a global time which is common for UEs is present. For example, when the former is used (when the information is composed of total time $T_{Total}$ for which the reception mode state is maintained), the UE that is a target of the D2D discovery signal can be configured to maintain the reception mode state for $T_{Total}$ from when the D2D discovery signal is received. If information related to D2D (data) communication is not received for the reception mode state maintenance time, the corresponding D2D UE may be configured to set a D2D communication related IDLE state or to perform the discovery stage. That is, when information related to D2D communication is not received for the reception mode state maintenance time, the corresponding D2D UE can consider that the D2D UE that has transmitted the D2D discovery signal including the corresponding information i) has been moved a long distance or ii) is in a state in which the D2D UE has difficulty continuously performing D2D data communication and setting the D2D communication related IDLE state or performing the discovery stage. In addition, when the D2D discovery signal including the aforementioned information is used, i) a discovery confirmation procedure or ii) a procedure of confirming whether a D2D data communication link has been correctly set up may be additionally performed in the discovery stage or the communication stage.

Furthermore, when "information on a time for which a UE that is a target of the D2D discovery signal needs to maintain a reception mode state (for D2D data communication link setup or D2D data communication, for example)" is included in the D2D discovery signal and transmitted, and the D2D UE receives the D2D discovery signal including the information, the D2D UE may be configured to transmit the D2D discovery signal in a period other than the "reception mode state maintenance time". Such operation may be performed only in a case in which the D2D UE that is a target receiving the aforementioned information does not transmit the D2D discovery signal for various reasons (e.g. D2D communication service OFF state or D2D communication related IDLE state) prior to reception of the D2D discovery signal including "information on a time for which the D2D UE that is a target of the D2D discovery signal needs to maintain the reception mode state".

According to the present invention, efficient discovery/communication stages of D2D UEs can be performed or discovery signal based efficient channel state estimation among D2D UEs can be performed.

The aforementioned embodiments of the present invention or examples of the proposed methods can be included in methods implemented by the present invention. In addition, the aforementioned methods can be implemented independently or by combining (aggregating) parts thereof.

In addition, the aforementioned embodiments of the present invention can be extended and applied to a case in which D2D communication is performed in an environment in which carrier aggregation (CA) is employed. Additionally, the aforementioned embodiments of the present invention can be extended and applied to not only a case in which one-to-one D2D communication is performed between D2D UEs but also a case in which one-to-many or many-to-one D2D communication is performed. The aforementioned embodiments of the present invention can be extended and applied to at least one of the D2D communication stage, the D2D discovery stage, the D2D discovery signal and/or a D2D data transmission channel.

Figure 14:
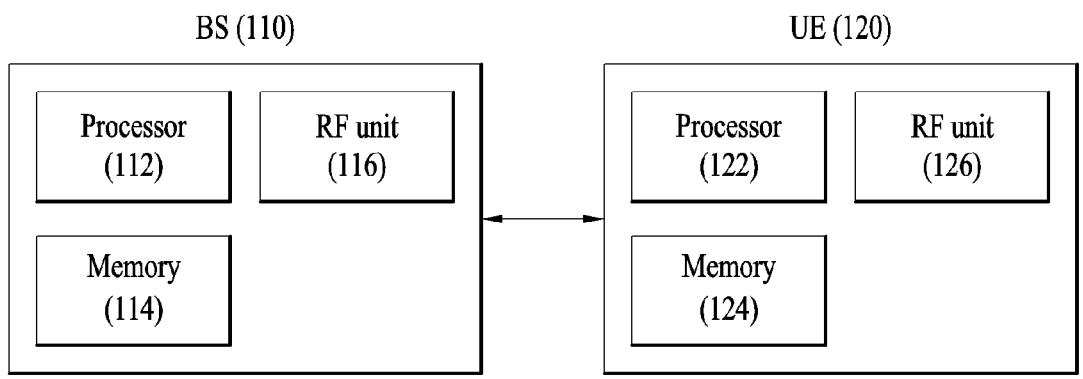
FIG. 14 illustrates a base station and a UE to which an embodiment of the present invention is applicable.

FIG. 14 illustrates a BS and a UE applicable to an embodiment of the present invention.

When a wireless communication system includes a relay, communication is performed between a BS and the relay on a backhaul link and between the relay and a UE on an access link. Accordingly, the BS or the UE shown in FIG. 14 can be replaced by a relay according to situation.

Referring to FIG. 14, a wireless communication system includes the BS 110 and the UE 120. The BS 110 includes a processor 112, a memory 114 and a radio frequency (RF) unit 116. The processor 112 may be configured to implement procedures and/or methods proposed by the present invention. The memory 114 is connected to the processor 112 and stores various types of information related to operations of the processor 112. The RF unit 116 is connected to the processor 112 and transmits and/or receives RF signals. The UE 120 includes a processor 122, a memory 124 and an RF unit 126. The processor 122 may be configured to implement procedures and/or methods proposed by the present invention. The memory 124 is connected to the processor 122 and stores various types of information related to operations of the processor 122. The RF unit 126 is connected to the processor 122 and transmits and/or receives RF signals. The BS 110 and/or the UE 120 may have a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

A specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the terms, fixed station, Node B, eNode B (eNB), access point, etc.

The embodiments of the present invention may be achieved by various means, for example, hardware, firmware, software, or a combination thereof. In a hardware configuration, an embodiment of the present invention may be achieved by one or more ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein

INDUSTRIAL APPLICABILITY

While the signal transmission method for D2D communication in a wireless communication system and the device therefor are applied to 3GPP LTE in the aforementioned embodiments, the method and device can be applied to various wireless communication systems other than 3GPP LTE.

The invention claimed is:

1. A method for transmitting a Device-to-Device (D2D) discovery signal by a first User Equipment (UE) in a wireless communication system, comprising:
determining, by the first UE, whether D2D data to be transmitted is present or absent;
transmitting, by the first UE to a second UE, a D2D discovery signal which is configured by a first D2D discovery signal format to indicate whether the D2D data to be transmitted is present or absent, if it is determined that the D2D data to be transmitted is absent, wherein the first D2D discovery signal format comprises an identifier of a UE transmitting the D2D data and does not include an identifier of a UE receiving the D2D data; and
transmitting, by the first UE to the second UE, a D2D discovery signal which is configured by a second D2D discovery signal format to indicate whether the D2D data to be transmitted is present or absent, if it is determined that the D2D data to be transmitted is present, wherein the second D2D discovery signal format comprises the identifier of the UE transmitting the D2D data and the identifier of the UE receiving the D2D data,
wherein the identifier of the UE receiving the D2D data is set to use an extra bit generated when the identifier of the UE transmitting the D2D data is compressed at a predefined level.

2. The method according to claim 1, wherein at least one of the identifier of the UE transmitting the D2D data or the identifier of the UE receiving the D2D data is set to a predetermined value when the D2D discovery signal indicates absence of the D2D data.

3. The method according to claim 2, wherein the predetermined value is regarded as a virtual cyclic redundancy check (CRC).

4. The method according to claim 1, wherein the D2D discovery signal further includes a virtual identifier.

5. The method according to claim 4, wherein the virtual identifier is determined on the basis of the identifier of the UE receiving the D2D data and the identifier of the UE transmitting the D2D data.

6. The method according to claim 1, wherein the D2D discovery signal further includes information on a compression level of the identifier of the UE transmitting the D2D data and information on a compression level of the identifier of the UE receiving the D2D data.

7. The method according to claim 1, wherein the D2D discovery signal includes information on a first compression level for the identifier of the UE transmitting the D2D data and information on a second compression level for the identifier of the UE receiving the D2D data, and
wherein the first compression level is set to be higher than the second compression level.

8. The method according to claim 1, wherein the D2D discovery signal is allocated to a resource region differently according to presence or absence of the D2D data for D2D communication and transmission.

9. The method according to claim 1, wherein the D2D discovery signal further includes status information related to a reception mode of the D2D data.

10. The method according to claim 9, wherein the status information is composed of total time for which the reception mode of the D2D data is maintained or a start time and end time of the reception mode of the D2D data.

11. A first UE configured to transmit a Device-to-Device (D2D) discovery signal in a wireless communication system, comprising:
a radio frequency unit; and
a processor,
wherein the processor is configured to:
determine whether D2D data to be transmitted is present or absent,
transmit, to a second UE, a D2D discovery signal which is configured by a first D2D discovery signal format to indicate whether the D2D data to be transmitted is present or absent, if it is determined that the D2D data to be transmitted is absent, wherein the first D2D discovery signal format comprises an identifier of a UE transmitting the D2D data and does not include an identifier of a UE receiving the D2D data, and
transmit, to the second UE, a D2D discovery signal which is configured by a second D2D discovery signal format to indicate whether the D2D data to be transmitted is present or absent, if it is determined that the D2D data to be transmitted is present, wherein the second D2D discovery signal format comprises the identifier of the UE transmitting the D2D data and the identifier of the UE receiving the D2D data,
wherein the identifier of the UE receiving the D2D data is set to use an extra bit generated when the identifier of the UE transmitting the D2D data is compressed at a predefined level.

* * * * *